United States Patent [19]

Shackelford et al.

[11] Patent Number: 5,388,429
[45] Date of Patent: Feb. 14, 1995

[54] COOLING EQUIPMENT

[75] Inventors: Howell B. Shackelford, Griffin; Casey F. Hammonds, Hampton, both of Ga.

[73] Assignee: Low Temp Industries, Inc., Jonesboro, Ga.

[21] Appl. No.: 74,138

[22] Filed: Jun. 9, 1993

[51] Int. Cl.[6] .............................................. F25D 17/02
[52] U.S. Cl. .................................... 62/446; 62/272; 62/458
[58] Field of Search ............... 62/272, 285, 407, 443, 62/444, 446, 454, 458

[56] References Cited

U.S. PATENT DOCUMENTS

| | | | |
|---|---|---|---|
| 1,716,366 | 6/1929 | Bond | 62/407 |
| 1,912,577 | 6/1933 | Glass | 62/433 |
| 1,950,781 | 3/1934 | Burns | 62/457.9 |
| 1,979,590 | 11/1934 | Vretman | 62/285 |
| 2,052,407 | 8/1936 | King | 62/433 |
| 2,446,686 | 8/1948 | Behrens | 62/458 |
| 2,463,104 | 3/1949 | Hender | 62/255 |
| 2,478,617 | 8/1949 | Anderegg | 62/454 |
| 2,532,234 | 11/1950 | Kimble | 62/457.9 |
| 2,612,761 | 10/1952 | Hilker | 62/457.9 |
| 2,732,689 | 1/1956 | Shreve | 62/257 |
| 3,491,548 | 1/1970 | Christiansen | 62/255 |
| 4,216,658 | 8/1980 | Baker et al. | 62/99 |
| 4,356,708 | 11/1982 | Horton | 62/430 |
| 4,459,825 | 7/1984 | Crouch | 62/404 |
| 4,840,040 | 6/1989 | Fung | 62/255 |

OTHER PUBLICATIONS

Brochure of Chandler Refrigeration (Heatcraft, Inc.) entitled "Reach-In Unit Cooler Model CBC," two pages (copyright 1989).
Pp. 23-24 and A1-A7 of proposed NSF International Standard No. 7.

*Primary Examiner*—Denise L. Gromada
*Assistant Examiner*—William C. Doerrler
*Attorney, Agent, or Firm*—Kilpatrick & Cody

[57] ABSTRACT

Equipment for cooling or maintaining the temperature of food or other products is disclosed. The cooling equipment uses turbulent rather than laminar (or no) airflow to promote and enhance product cooling and contemplates refrigeration tubing contacting the interior sides rather than exterior surfaces of an associated liner. Isolating the airflow system from the ambient environment reduces the possibility of product warming or contamination caused by contact with warmer, debris-laden ambient air.

8 Claims, 2 Drawing Sheets

COOLING EQUIPMENT

The present invention relates to cooling or refrigeration equipment and more particularly to liners, pans, and dispensers such as those used in connection with commercial salad bars and cold or frozen foods.

BACKGROUND OF THE INVENTION

Existing cold food counter designs such as that illustrated in FIG. 1 typically include an open interior liner 10 formed of stainless steel into which a pan or similar food-containing utensil is placed. Insulation 14 surrounds the enclosed sections of liner 10, which insulation 14 in turn is enclosed within an exterior metal liner 18. Tangentially contacting the surface 22 of the interior liner 10 opposite the food-containing pan is copper tubing 26 through which cooling fluid circulates. Because tubing 26 contacts this exterior surface 22 of the interior liner 10 only tangentially, the resulting cooling effect on the volume within interior liner 10 is diminished, limiting the counter's ability to maintain food products in the pan at a suitable temperature. This limited cooling surface similarly precludes use of fans or other air moving systems to enhance the effectiveness of the counter, as doing so would merely defrost liner surfaces and ultimately increase, rather than decrease, resulting temperatures. Consequently, existing commercial counters continue to be static ones lacking substantial airflow.

U.S. Pat. No. 2,463,104 to Hender illustrates an open-top display case in which refrigerant-carrying pipes are similarly arranged about the exterior surface of the interior liner or container. Unlike current static commercial cold food counters, however, the display case disclosed in the Hender patent includes fans positioned outside the container. The fans function to draw air into the container and then circulate it along the container's exterior surfaces, past the pipes and over the container sides. Although this cooled air can then be redrawn into the container, ambient air is drawn with it, subjecting food within the container to other than solely cooled air. Drawing ambient air through the container also increases the possibility of food contamination through contact with bacteria and other particulate matter present in the ambient air.

U.S. Pat. No. 4,840,040 to Fung discloses a similar display cabinet in which cooling coils are placed adjacent the exterior surface of a panel. As with the display case of the Hender patent, that illustrated in the Fung patent utilizes a fan to draw air into the display space and circulate it past the external coils. The process too draws ambient air into the display space, decreasing the cooling capability of the air passing through that space. By ducting air between the display space wall exteriors and the interior walls of the display counters or cases, the systems described in both the Hender and Fung patents should also cause the air flowing through the food-containing spaces to be essentially non-turbulent (i.e. laminar).

Current industry and governmental health and safety regulations, moreover, require food-containing utensils to be elevated above their respective counter surfaces. Existing commercial utensils thus include lips or flanges around their upper perimeters that are supported by the counter surfaces. This relationship between flange and counter surface prevents food from spilling into the interiors of the counters. At the same time, however, it effectively seals that interior from the ambient environment, precluding air circulation as proposed in the Hender and Fung patents.

SUMMARY OF THE INVENTION

The present invention provides an alternative cold food counter design using turbulent rather than laminar (or no) airflow to promote and enhance product cooling. One or more fans installed within the liner force air downward toward the bottom interior surface of the liner, producing turbulent movement around that interior surface. Because the airflow system is closed to the ambient environment when a food-containing pan is positioned within the volume created by the liner or a cover is attached to the counter, it also reduces the possibility of contamination and warming caused by drawing the warmer, debris-laden ambient air past the food inside the pan.

The invention additionally contemplates refrigeration tubing contacting the interior sides rather than exterior surfaces of the liner, thereby increasing the evaporator surface area available for cooling. To prevent food within the pan from abutting the refrigeration tubing, the. present design includes stainless steel or other protective covers interposed between the tubing and the sides of the pan. The protective covers define openings along their bottoms, which may be staggered or otherwise positioned as desired to permit condensation to drain from the tubing into the counter interior.

By positioning the tubing and (axial) fans within the liner and permitting the pan flanges to seal a volume of air intermediate the pan exterior and liner interior, the present system appears to meet (and exceed) proposed NSF International Standard No. 7. In ambient temperatures of approximately 90° F., for example, the system is capable of maintaining the temperature of the standard NSF test media within an open stainless steel pan at 40° F. or less for as much as six hours. Other tests have shown that, in approximately the same period, the present system will cool the standard test media in an open pan from 75° F. to 40° F. Covering the top of the pan or counter permits the system to cool the same test media to 40° F. in approximately three hours. As a result, the system of the present invention is useful for multiple food-related purposes, including in connection with commercial salad bars and milk and ice cream containers.

It is therefore an object of the present invention to provide a cooling system utilizing turbulent airflow within a liner.

It is an additional object of the present invention to provide refrigeration tubing within the interior of a liner.

It is another object of the present invention to provide a dynamic cooling system isolated from the ambient environment, reducing the possibility of product warming or contamination caused by contact with ambient air.

It is a further object of the present invention to provide a cooling system in which the refrigeration tubing is separated from food or a food-containing pan using protective covers.

It is yet another object of the present invention to provide a cooling system in which the protective covers include openings permitting condensation to drain.

Other objects, features, and advantages will become apparent with reference to the remainder of the text and drawings of this application.

DETAILED DESCRIPTION

Figure 1:
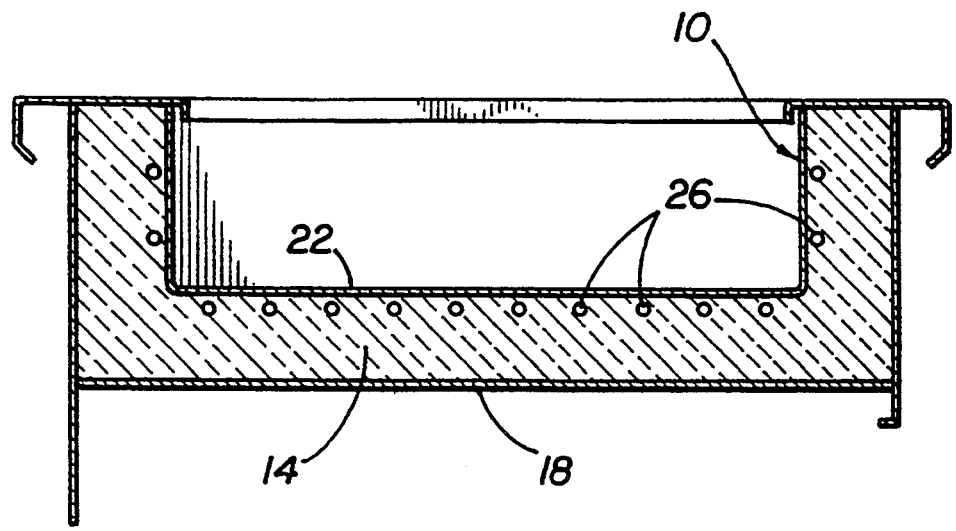
FIG. 1 is a cross-sectioned, elevational view of an existing cold food counter.
Figure 2:
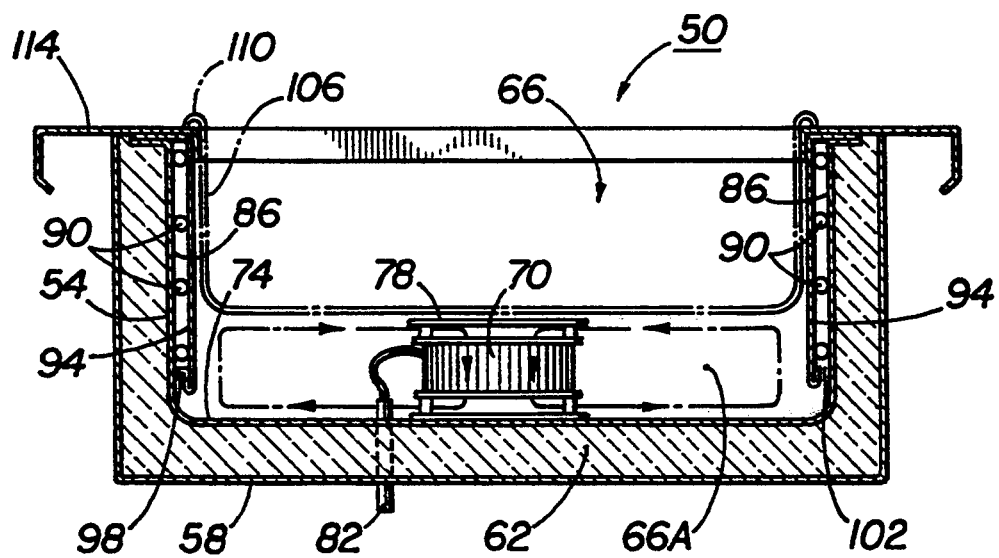
FIG. 2 is a cross-sectioned, elevational view of an embodiment of the present invention.

FIG. 2 illustrates an embodiment of cooling equipment 50 of the present invention particularly (although not exclusively) useful for commercial salad bars. Equipment 50 includes a stainless steel or other suitably-formed interior liner 54, an exterior liner 58, and urethane foam or other insulating material 62 interposed therebetween. Interior liner 54 is designed to be open to the ambient environment in the embodiment of FIG. 2, thereby only partially enclosing a volume or space 66.

Also shown in FIG. 2 is fan 70 mounted to the bottom surface 74 of interior liner 54 within space 66. Fan 70, which directs air toward bottom surface 74, may include an attached intake guard or cover 78 to prevent food or other solids or liquids from accidentally contacting fan 70 itself. Fan 70 is also connected to an appropriate source of electrical or other power through connector 82.

Mounted to one or more internal surfaces 86 of interior liner 54 is tubing 90. In use, tubing 90 connects to a suitable supply of cooling fluid (refrigerant) and is designed to circulate that cooling fluid through equipment 50 as illustrated in FIG. 2. In some embodiments of equipment 50 consistent with FIG. 2, tubing 90 is nominally made of one-half inch diameter copper pipe. Placing tubing 90 within interior liner 54 permits virtually its entire surface area to be used for cooling the space 66, increasing the cooling efficiency of equipment 50.

FIG. 2 additionally illustrates a cover 94 for each set of tubing 90 mounted within interior liner 54. Such covers 94 may be included as part of equipment 50 for sanitation (or other) purposes, particularly if governmental regulations prohibit use of exposed metal piping in areas such as space 66. Covers 94 also function to protect tubing 90 from punctures or other damage. If formed of stainless steel or other non-insulating material, covers 94, when cooled through contact with tubing 90, may additionally serve to increase the surface area within space 66 useful for cooling. As shown in FIG. 2, covers 94 may be mounted to the interior liner 54 and may extend into space 66 approximately parallel to interior surfaces 86. Covers 94 also include flanges 98 along their lower length that define periodic openings 102 through which condensation accumulating on tubing 90 may drain. If two covers 94 are employed, the periodic openings 102 of each may be staggered longitudinally as illustrated in FIG. 2.

In use, equipment 50 is designed to receive into space 66 a pan 106 containing food or other products. Pan 106 has lips 110 that are supported by the upper surfaces 114 of the equipment 50. In this manner, the lips 118 of pan 106 are elevated above upper surfaces 114, reducing the likelihood that food or other products will spill onto upper surfaces 114 when removed from pan 106 by consumers. Contact between lips 110 and upper surfaces 114 also isolates from the ambient environment that portion 66A of space 66 remaining within interior lining 54 after pan 106 is received.

Isolating space 66A from the ambient environment produces a closed airflow system less susceptible to contaminants in or warming because of that ambient air, as no such air is drawn through the products contained in pan 106. Utilizing fan 70 to direct air within space 66A toward bottom surface 74 also produces a turbulent airflow through space 66A. This dynamic system promotes product cooling throughout pan 106, as air within space 66A is continually recirculated within the system as it is cooled by the cooling fluid circulating through tubing 90. If defrosting is necessary, the supply of cooling fluid for tubing 90 can be stopped temporarily while fan 70 remains operational without significant elevation of product temperature. Because equipment 50 provides increased cooling efficiency over existing systems, cooling fluid need not be generated and circulated through tubing 90 as frequently as is now required.

Figure 3:
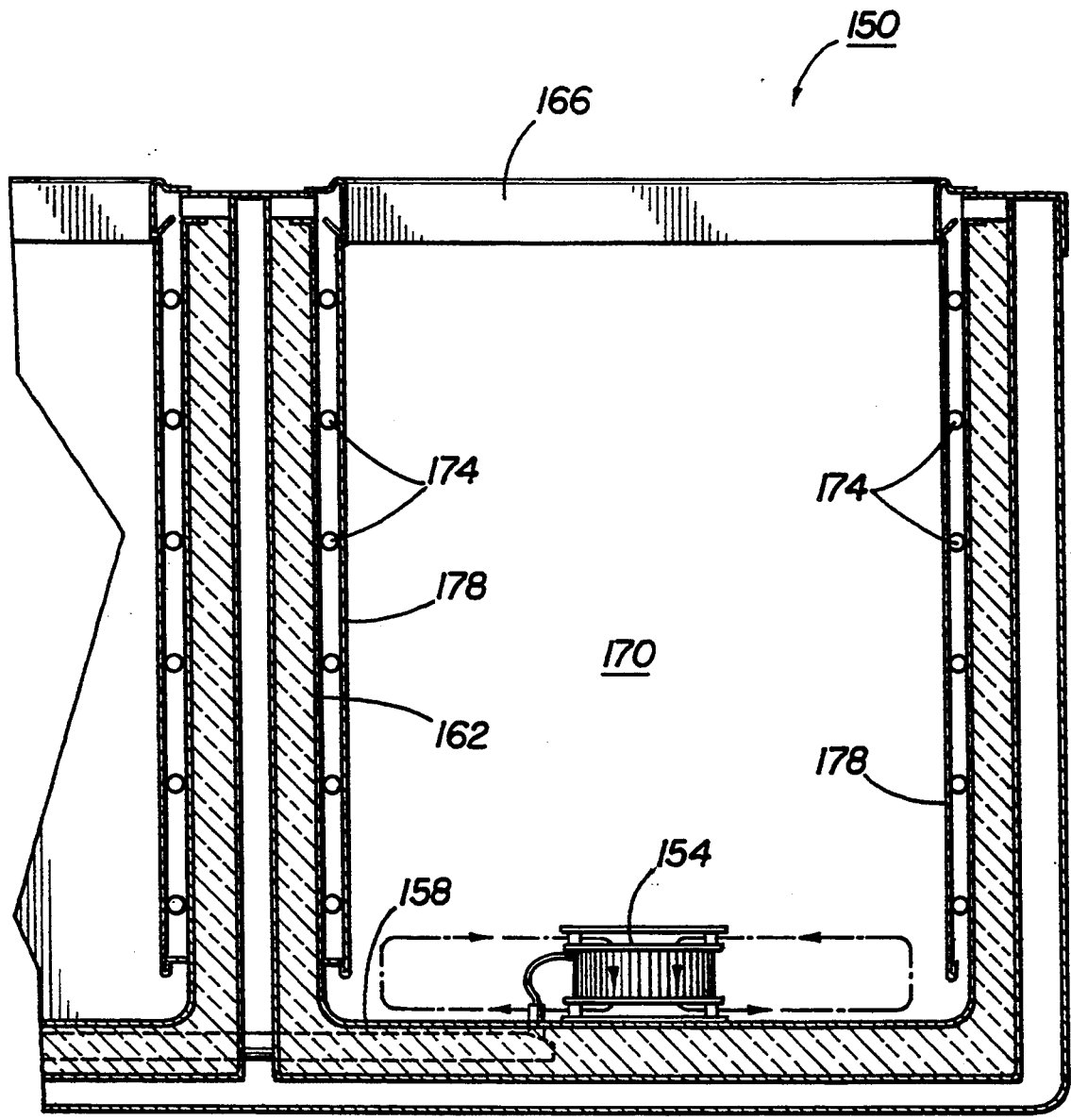
FIG. 3 is a cross-sectioned, elevational view of an alternate embodiment of the present invention.

FIG. 3 illustrates alternate cooling equipment 150 of the present invention. Such equipment 150 may typically (although not exclusively) be used as a milk or ice cream dispenser, including those used in school systems or other public or private food-service institutions. Similar to equipment 50, equipment 150 includes one or more fans 154 directing air toward the bottom surface 158 of interior liner 162. Equipment 150 also comprises a hinged or other top 166 designed to cover the space 170 within interior liner 162, effectively isolating the space 170 from the ambient environment. Top 166 may, of course, be opened or removed as necessary to permit consumers to access food or other products within space 170. As with equipment 50, equipment 150 further includes tubing 174 positioned within space 170 and protective covers 178.

Because it utilizes operating principles similar to those of equipment 50, equipment 150 likewise promotes product cooling. Equipment 150 additionally provides relatively constant cooling temperatures throughout the depth of space 170, avoiding the substantially non-uniform results typically achieved by existing dispensers. As noted above, tests indicate that with top 166 covering space 170, equipment 150 is capable of cooling the standard NSF test media from 75° F. to 40° F. in approximately three hours, less than, for example, the time between many commercial milk deliveries and scheduled serving periods in schools. To prevent consumers from contacting fan 154 when accessing space 170, a partial or complete platform can be included and attached to a mechanism for raising the platform (such as a spring-loaded "Lowerator") above the bottom surface 158 of interior liner 162.

The foregoing is provided for purposes of illustrating, explaining, and describing embodiments of the present invention. Modifications and adaptations to these embodiments will be apparent to those of ordinary skill in the art and may be made without departing from the scope or spirit of the invention.

What is claimed is:

1. Equipment for receiving a product and maintaining the temperature of the product below that of an ambient temperature, comprising:
   a. a liner defining a volume adapted to be isolated from the ambient environment when the product is received;
   b. means, comprising tubing positioned within the volume and contacting the liner, for enclosing and circulating cooling fluid;

c. means, positioned within the volume, for generating turbulent airflow through at least a portion of the volume; and d. a non-insulating cover positioned within the volume in contact with the tubing.

2. Equipment according to claim 1 in which the liner has a bottom surface and the turbulent airflow generating means comprises at least one fan mounted to the bottom surface so as to direct air within the volume toward the bottom surface.

3. Equipment according to claim 1 in which the non-insulating cover comprises means for permitting condensation accumulating on the tubing to drain to the bottom surface.

4. Equipment according to claim 3 in which the condensation drain means comprises a flange integrally formed with the non-insulating cover, which flange defines at least one opening through which condensation can drain.

5. Equipment according to claim 4 further comprising a top contacting the liner, for isolating the volume from the ambient environment.

6. Equipment for receiving a product and maintaining the temperature of the product below that of an ambient environment, comprising:

a. a liner (i) defining a first volume adapted to receive a pan containing the product, (ii) defining a second volume adapted to be isolated from the first volume and the ambient environment when the pan is received, and (iii) having a bottom surface;

b. first tubing, positioned at least partially within the second volume and contacting the liner, for enclosing and circulating cooling fluid;

c. at least one axial fan, positioned within the second volume and mounted to the bottom surface, for generating turbulent airflow through the second volume by directing air within the second volume toward the bottom surface; and d. a first non-insulating cover (i) having a length, (ii) at least partially positioned within the second volume in contact with the first tubing, and (iii) comprising an integrally-formed flange along its length, which flange defines a plurality of openings through which condensation accumulating on the tubing can drain to the bottom surface.

7. Equipment according to claim 6 further comprising:

a. second tubing, positioned at least partially within the second volume and contacting the liner, for enclosing and circulating cooling fluid; and b. a second non-insulating cover (i) having a length, (ii) at least partially positioned within the second volume in contact with the second tubing, and (iii) comprising an integrally-formed flange along its length, which flange defines a plurality of openings staggered relative to the openings defined by the flange of the first non-insulating cover.

8. Equipment for receiving a pan containing edible products exposed so that the contents of the pan are accessible and for maintaining the pan and its contents below the temperature of an ambient environment, the equipment comprising:

a. a liner adapted to receive the pan so that a volume is isolated from the ambient environment when the pan is received;

b. tubing, placed close to the liner and at least partially adjacent to the volume, for circulating cooling fluid;

c. a non-insulating cover at least partially positioned within the volume so as to be in thermally conductive contact with at least a portion of the tubing; and d. at least one fan for generating turbulent airflow throughout the volume so that the air is cooled through contact with the cover and so that the cooled air encapsulates at least a portion of the pan in order to maintain the temperature of the contents of the pan below the temperature of the ambient environment.

* * * * *